J. Patch.
Screw Propeller.

Nº 6,914. Patented Nov. 27, 1849.

UNITED STATES PATENT OFFICE.

JOHN PATCH, OF BOSTON, MASSACHUSETTS.

PROPELLER.

Specification of Letters Patent No. 6,914, dated November 27, 1849.

*To all whom it may concern:*

Be it known that I, JOHN PATCH, of Boston, in the county of Suffolk and State of Massachusetts, have invented a new and useful Improvement in the Propeller for Propelling Vessels which is Described as follows, reference being had to the annexed drawings of the same, making part of this specification.

Figure 2:
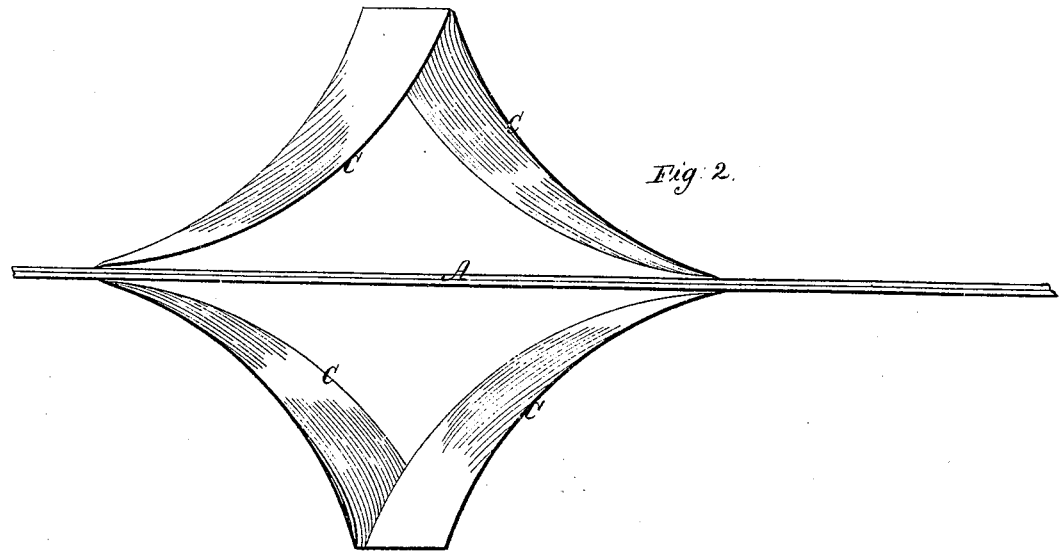
Figure 1:
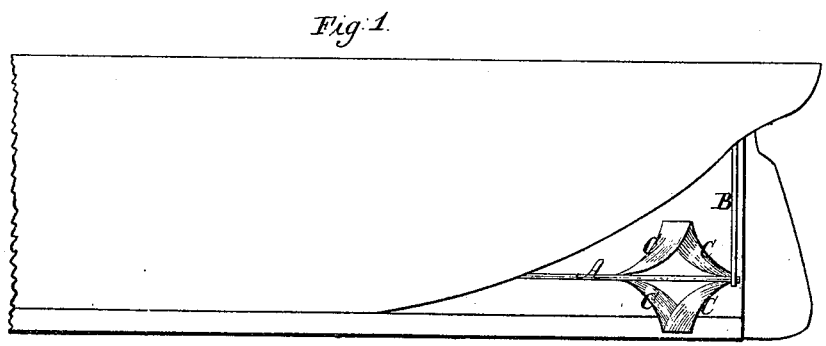

Figure 1 is a side elevation of a propeller applied to a vessel. Fig. 2 is a side elevation of a propeller on a larger scale detached from the vessel.

Similar letters in the figures refer to corresponding parts.

The nature of this invention and improvement consists in attaching to a horizontal shaft passing through a stuffing box in the stern part of the vessel on either side of the rudder a sufficient distance below the surface of the water four spiral segmental plates arranged in reverse positions and connected together at their outer extremities in such a manner that when said shafts are revolved with a proper degree of speed the surfaces of the spiral segmental plates will be caused to strike the water at such an angle with the line upon which the vessel moves as to cause the vessel to be forced or propelled forward with a speed commensurate with the size of the spiral plates and the power applied to the same.

To enable others skilled in the art to make and use my invention I will proceed to describe its construction and operation.

A, are horizontal shafts passing through stuffing boxes in the curvilinear part of the stern of the vessel on either side of the stern post, being attached at their inner extremities inside the vessel by cranks or otherwise, to the motive power of the steam engine.

B, is a metallic rod or bar firmly secured to each side of the stern post of the vessel at its upper end and having a box at its lower end into which is inserted the outer extremity of the shaft forming a support for the same.

C, are four segmental spiral plates secured to each shaft between its outer end and the point where it passes through the stuffing box in the vessel. These plates are made of spiral curvilinear tapering form, secured to the shaft at their smaller ends and extending outward from the same at angles of 45 degrees, so as to approach each other at their outer ends where they are connected together in such a manner that if lines were drawn from their apex to the points where they are secured to the shaft, such lines would form the four sides of a square as represented in Fig. 2.

Instead of using two propellers as above set forth and represented in the drawings, one only may be employed in which case the shaft of the same will pass through a stuffing box in the stern post, and be supported at its outer extremity by a rod or brace extending down from below the taffrail of the vessel.

The spiral segmental plates being arranged in relation to the shaft as before described, one surface of each of them will, when revolved by the power inside the vessel, press against the water at an angle of about 45 degrees (more or less); and the density or unyielding nature of the water at the depth this takes place is such, that they will cause the vessel to be forced or propelled forward at a speed proportionate with the size and speed of said plates.

By reversing the motion of the propeller, the action of the same on the waters will likewise be reversed, and the vessel will be moved sternwise. By slanting the blades or plates of the propeller in reverse directions, and attaching them together at their outer extremities, as set forth, they may be made more thin with the same strength and secured as in the usual construction of propellers.

What I claim as my invention and desire to secure by Letters Patent is—

The propeller constructed of two spiral curvilinear, tapering plates, formed and secured to the shaft, as represented, and described. And connected together at their outer extremities, and this I claim irrespective of the number of sets of these propellers, that may be placed on one shaft, or of the number of shafts that may be used in propelling one vessel.

JOHN PATCH.

Witnesses:
JAMES PRENTISS,
JOEL BOWKER.